Patented Sept. 23, 1941

2,256,962

UNITED STATES PATENT OFFICE 2,256,962

RECOVERING CARBON DIOXIDE FROM FLUE GASES

Gustave T. Reich, Philadelphia, Pa.

No Drawing. Application October 20, 1938, Serial No. 236,001

3 Claims. (Cl. 23—150)

My improvement in obtaining carbon dioxide from flue gases belongs to the class of processes where the carbon dioxide in the flue gas is absorbed in an alkali carbonate solution with the conversion of a part of the alkali carbonate into an alkali bicarbonate and then thermally dissociating this alkali bicarbonate into carbon dioxide gas and an alkali carbonate. In this process water is taken up from the solution to form the alkali bicarbonate and is released when the bicarbonate is dissociated. What is considered the "Standard process," (which is described by Jones and Quinn in their treatise entitled, Carbon dioxide, page 62 published by the Reinhold Publishing Corporation at 330 West Forty-second Street, New York city, in 1936), is to absorb in an alkali carbonate solution, such as sodium carbonate, the carbon dioxide from the flue gas allowing the nitrogen and other gases to escape, with the formation in this sodium solution of a solution containing alkali carbonate and alkali bicarbonate and then heating the solution and thereby thermally dissociating the sodium bicarbonate in solution into alkali carbonate (sodium carbonate) and carbon dioxide in a gaseous state, the water from the dissociation passing into solution or passing off as steam with the gaseous carbon dioxide.

According to this recognized authority, an absorbing sodium carbonate solution should contain 7 to 8 lbs. of sodium carbonate ($Na_2CO_3$) to a cubic foot of solution which is the optimum proportion.

Upon the absorption of the carbon dioxide from the flue gas the greater part of the sodium carbonate was converted into bicarbonate, depending upon the thoroughness of the mingling of the flue gas and the alkali solution. If a solution of this concentration to be treated (page 168) were thermally dissociated, supposing that it passed through the dissociator at the rate of fifty gallons per minute, more than half of the sodium bicarbonate would remain in solution and in actual practice only 3.16 pounds of carbon dioxide gas would be obtained per minute and a large amount of the solution would have to be evaporated. This evaporation would require additional fuel and cost. In other words to produce one pound of carbon dioxide required the dissociation of 3.81 pounds of sodium bicarbonate and the evaporation of twelve gallons of water from the lye. The relative quantity of lye evaporated increased as the solution became poorer in alkali bicarbonate, and it became commercially unprofitable to carry the dissociation further than mentioned above. (Jones et al. supra at page 168.)

Taking as an example of the standard process, if twelve gallons of strong lye contained eight pounds of alkali bicarbonate, be treated by the standard process but 3.81 pounds of alkali bicarbonate would be dissociated because to dissociate preferably the remaining 4.19 would require so much heat to evaporate such a large quantity of water that doing so would be commercially impossible.

This application is an improvement upon this standard process. It is to be taken as the primary or original application, over my co-pending application, 190,859.

Processes of recovering carbon dioxide from flue gases are continuous, and the material left in solution after the dissociation of the alkali bicarbonate, must be free from adulterate material.

I have discovered that the absorptive power of the alkali carbonate solution is not decreased by the presence of alkali bicarbonate suspended in it, but that such suspension adds to the quantity of suspended bicarbonate delivered to the dissociator. No reason exists why the absorbing solution should not contain a substantial portion of it. Therefore, instead of admitting to the absorber a solution that is free from this suspension, which is unnecessary, I admit to the absorbing solution substantial quantities of suspended alkali bicarbonate. This suspended alkali bicarbonate is added to the solution during the absorption stage, by the conversion of the alkali carbonate into alkali bicarbonate, a large quantity of which will be precipitated as a suspension. This solution may be dissociated.

I have discovered also that if this solution carries a large quantity of suspended alkali bicarbonate to the dissociator, and if the dissociation proceeds in the presence of alkali carbonate and alkali bicarbonate in saturated solution, and in the absence of adulterant material, and at a temperature a very little exceeding the temperature at which solid alkali bicarbonate dissociates, the suspended alkali bicarbonate dissociates with very little evaporation of the water of the solution. The quantity of the alkali bicarbonate in suspension may be large. The suspended alkali bicarbonate is dissociated into carbon dioxide gas and alkali carbonate and a quantity of water is set free by the dissociation. The alkali carbonate so formed replaces the bicarbonate in solution. Whether a displacement of the alkali bicarbonate in solution is caused by the carbonate produced by the bicarbonate in suspension being dissociated, or whether a dissociation of some of the bicarbonate in solution sufficient to allow the carbonate to replace it I have not determined with certainty, nor is the determination important. The important matter being that the dissociation occurs entirely or nearly so at the suspended particles; occurs at a low heat at a temperature below that at which the dissociation of the bicarbonate in solution could be effectively accomplished, if dissociated at all, and the dissociation of the suspended alkali bicarbonate proceeds, without evaporating the water of the solution to any appreciable extent; in fact the water in the solution appears sometimes to be added to by the water set free by the dissociation of the bicarbonate. A saturated solution of the alkali carbonate is maintained at all times. The speed of the flow of the solution through the dissociator is a factor determining the thoroughness of the dissociation of the bicarbonate. The quantity of the bicarbonate in the saturated solution may be reduced to zero, but as the dissociation of the alkali bicarbonate suspension approaches its limit the dissociation becomes rapidly more difficult and slow; so, ordinarily it is not profitable to dissociate too thoroughly, and also it is unnecessary, because the presence of the alkali bicarbonate suspension in the solution at the absorption stage does not harm the effectiveness of the absorption.

I have discovered also that the dissolving of alkali carbonate in a solution containing bicarbonate in solution will, under certain circumstances cause a portion of the bicarbonate to be precipitated as a suspension. If the solution drawn off from the dissociator is saturated with alkali carbonate, at the high temperature at which it leaves the dissociator, it becomes supersaturated when reduced to a lower temperature, and if mingled with a saturated solution of alkali carbonate and alkali bicarbonate the alkali carbonate in the supersaturated solution will precipitate the alkali bicarbonate from the other solution from solution to suspension.

I have taken advantage of this last discovery to increase the relative quantity of the precipitated alkali bicarbonate in suspension. I accomplish this by settling the solution from the absorber, which is a saturated solution of carbonate and bicarbonate with a suspension of the alkali bicarbonate, and removing from it the parts containing little or no suspension, and mixing with the removed part, supersaturated carbonate containing, solution from the dissociator that has been cooled. This will cause precipitation of alkali bicarbonate as a suspension, which may be used either in the solution that is returned to the absorber, or in that carried into the dissociator. In either case the quantity of suspended alkali bicarbonate will be increased.

The successive steps of my process may be summarized as follows: An absorption step where the flue gas is passed through a saturated solution of alkali carbonate preferably while the latter is agitated. This solution contains also alkali bicarbonate in suspension and in practice also in solution, until a large portion of the alkali carbonate (normal) is converted into bicarbonate in suspension, then the step of passing this solution either immediately or after other treatment into a dissociator where the suspended bicarbonate is dissociated thermally at a temperature that will dissociate the suspended alkali bicarbonate and low enough to affect very slightly or not at all bicarbonate in solution, and the dissociation is limited in length or temperature or both so that the water evaporated from the solution shall not exceed substantially the water restored to the solution by the dissociation of the bicarbonate, whereby carbon dioxide gas is evolved, with the production of alkali carbonate in saturated solution, and some alkali bicarbonate in solution and in suspension. Interpolated between these steps may be a step where the solution from the absorber and the solution from the dissociator are mingled with the precipitation of more alkali bicarbonate.

An essential condition in the operation of the process is that some degree of excess bicarbonate is present so as to maintain some bicarbonate in solid form in suspension. This, of course, necessitates that the solution be at all times saturated with respect to the bicarbonate. The actual amount of dissolved bicarbonate will vary being dependent on the amount of normal carbonate present, the normal carbonate may be in such large amount as to reduce the solubility of the bicarbonate to practically zero.

The proportions that are critical in the thermal dissociation step (usually the alkali is sodium) are (to 100 parts of water 5 to 15 parts of sodium carbonate, and 5 to 15 parts of sodium bicarbonate in solution. The quantity of suspended sodium bicarbonate is not critical within wide limits. The temperature in the dissociator is preferably maintained at not above 110° C. or below that at which sodium bicarbonate or sodium carbonate solution boils. The rapidity of passage of the liquid containing the sodium bicarbonate to be dissociated depends on several conditions which will be explained below.

Ordinarily the dissociation proceeds at atmospheric pressure but vapor tensions of the heated solution may be increased by pressure up to 10 pounds, and consequently the boiling points of the solutions raised, if this is necessary or desirable to diminish the evaporation of water. This will raise the quantity of carbon dioxide that can be produced profitably.

The temperature although optimum at 110° C. may be less say from 85° up to 110° C. The time of thermal dissociation should be long enough to dissolve a great part of the suspended bicarbonate but the clock time can not be stated definitely because it depends upon too many considerations.

The process is continuous and as no contamination of the sodium or other alkali carbonate occurs by the introduction of a foreign substance, the fluid may be circulated indefinitely. By using saturated solutions and a large quantity of bicarbonate in suspension during dissociation, the bicarbonate in suspension is converted rapidly into sodium carbonate which goes into solution very rapidly, saturating and keeping saturated the solution in the dissociator. By keeping the temperature in the dissociator down below that at which the solution will evaporate in any substantial quantity the solution water will be very slightly decreased by evaporating, and even more water may be restored to solution by the water set free by the dissociation of the suspended bicarbonate than was evaporated from it. To reach a point where a carbon dioxide gas is produced with no evaporation of water is not practically possible but a sufficiently close approach to it may be had to render the process very useful, The step mentioned above that might be interpolated between the absorption step and the dissociation step and which adds to the effectiveness of my process may be carried out by decantation of the solution coming from the absorber so that the upper part of the solution is free, or substantially free, from precipitated sodium bicarbonate. This is then drawn off and the solution from the dissociator is mingled with it. The solution drawn off from the dissociator is saturated and contains in solution saturated solution alkali carbonate, probably some alkali bicarbonate, and some suspended alkali bicarbonate. This solution may be cooled and may be mixed while hot. It is usually at a higher temperature than the solution at the absorption stage. The most efficient way of carrying out this mingling is where the solution from the absorber is cooled and is then mingled with the hot solution from the dissociator.

The quantity of the suspended alkali has practical limits in the absorber, and in the conductors leading from the dissociator immediately to the absorber. In operating my process, many operators may prefer to have the suspended alkali bicarbonate in very great quantity in the dissociator and to dissociate only a portion of it, returning the greater portion to the circuit. This mode of operation may be carried to such an extent that a solution may pass out from the dissociator so thick in alkali bicarbonate suspension that it will solidify or partially solidify on cooling or become so thickened that it will be unworkable in the absorber or conductors.

Treating this solution by simultaneous cooling and dilution it may be made workable readily. In many ways this mode of operation is very satisfactory, since the thickened solution having a heavy suspension of alkali bicarbonate is preferable in the dissociator, and a thinner solution having less suspended alkali bicarbonate, is preferable in the absorbing stage because the flue gases are more readily mingled with it and it can be agitated more easily.

By treating the hot liquid, heavily charged with suspended alkali bicarbonate by liquid from the thinner part of the liquid from the absorber that has been cooled, not merely will the alkali bicarbonate in solution in the decanted portion of the solution be precipitated and replaced by alkali carbonate, but also the thick solution from the dissociator will be made freer flowing. The circulating stream of the solution may therefore be said to have two conditions; the one of less fluidity and greater proportion of suspension content of alkali bicarbonate near the dissociator and the other of greater fluidity and less proportion of alkali bicarbonate suspension near the absorber.

This former solution as it cools may become supersaturated, or the alkali carbonate may expel the alkali bicarbonate from solution into suspension. If the portion of solution coming from the absorption tower that contains alkali bicarbonate in suspension is mixed with this solution from the dissociator, the excess of carbonate in the latter will precipitate some of the bicarbonate in the former, taking its place in the solution making it more predominately carbonate. This will make the resulting solution more efficient in the absorption of carbon dioxide from flue gas and also will increase its suspension content.

However this step need not be included, and varying conventional steps may be interposed and also various preparatory steps prior to the absorption step be used but none of these steps form either a portion of, or a limitation on, my invention which is to be construed as not limited except by the terms of the annexed claims.

I claim:

1. A continuous cyclic process for extracting carbon dioxide from flue gases, comprising absorbing the carbon dioxide present in the flue gas in a solution containing an alkali carbonate in saturated solution until alkali bicarbonate in saturated solution and a suspension of alkali bicarbonate is produced, dissociating thermally the suspended bicarbonate at a temperature below the boiling point of the solution sufficiently slowly to allow this dissociation to replace in the solution a quantity of water substantially equal to the water given off from the solution during the dissociation, said dissociation producing gaseous carbon dioxide and alkali carbonate, dissolving the alkali carbonate in the solution with the precipitation of alkali bicarbonate therefrom, and re-using the solution after the dissociation as an absorber.

2. In a continuous process of recovering carbon dioxide from flue gases by absorbing the carbon dioxide from the flue gases in an absorbing solution containing an alkali carbonate, and then securing carbon dioxide gas by thermally dissociating this solution in a dissociator, the step of using as an absorbing solution a saturated solution of alkali carbonate and alkali bicarbonate containing a suspension of alkali bicarbonate and balancing the temperature of the dissociation and the rapidity of the flow of the solution through the dissociator so that the release of water produced from the dissociation of the bicarbonate will substantially equal the water given off from the solution during the dissociation.

3. A continuous cycle process for extracting carbon dioxide from flue gases, comprising absorbing in a saturated solution of alkali carbonate and alkali bicarbonate, the carbon dioxide from flue gases until a solution is formed containing alkali bicarbonate in suspension in large quantities, and then dissociating thermally the suspended alkali bicarbonate, at a temperature below the boiling point of the solution, maintaining meanwhile the temperature of the solution and the speed of passage thereof through the dissociator sufficiently low to dissociate only part of the suspended bicarbonate and to cause the water formed from the bicarbonate during the dissociation to replace the water given off from the solution during said dissociation and causing the alkali carbonate formed by the dissociation to be dissolved in the solution and thereby maintaining the same saturation, and simultaneously decreasing the quantity of alkali bicarbonate in solution, and then re-using the saturated solution containing the alkali carbonate to absorb additional carbon dioxide from flue gases.

GUSTAVE T. REICH.